United States Patent
Murakami et al.

(10) Patent No.: US 8,787,456 B2
(45) Date of Patent: Jul. 22, 2014

(54) IMAGE DECODING DEVICE AND METHOD THEREOF USING INTER-CODED PREDICTIVE ENCODING CODE

(75) Inventors: Tomokazu Murakami, Kokubunji (JP); Yoshinori Suzuki, Saitama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 1452 days.

(21) Appl. No.: 11/066,169

(22) Filed: Feb. 28, 2005

(65) Prior Publication Data

US 2005/0243920 A1    Nov. 3, 2005

(30) Foreign Application Priority Data

Apr. 28, 2004 (WO) .................. PCT/JP04/06169

(51) Int. Cl.
*H04N 7/12* (2006.01)
*H04N 7/50* (2006.01)

(52) U.S. Cl.
CPC .................................. *H04N 7/50* (2013.01)
USPC ................................................... 375/240.12

(58) Field of Classification Search
CPC ..................................................... H04N 7/50
USPC ...................................................... 375/240.12
See application file for complete search history.

(56) References Cited

U.S. PATENT DOCUMENTS

| 5,732,157 A * | 3/1998 | Osawa .......................... 382/244 |
| 5,963,673 A | 10/1999 | Kodama et al. |
| 6,282,240 B1 * | 8/2001 | Fukunaga et al. ....... 375/240.01 |
| 2004/0042671 A1 * | 3/2004 | Westphal et al. ............. 382/232 |
| 2006/0008160 A1 | 1/2006 | Westphal et al. |
| 2006/0140495 A1 * | 6/2006 | Keeney et al. ................. 382/239 |

FOREIGN PATENT DOCUMENTS

| JP | 4-223786 | 8/1992 |
| JP | H07-170521 | 7/1995 |
| JP | 8-317403 | 11/1996 |
| JP | 9-200757 | 7/1997 |
| JP | 09-200757 | * 7/1997 ............... H04N 7/30 |
| JP | 09-322176 A1 | 12/1997 |
| JP | 2003-153273 A1 | 5/2003 |
| JP | 2005-026729 | 1/2005 |
| WO | WO 2004/021276 A2 | 3/2004 |

* cited by examiner

*Primary Examiner* — Sath V Perungavoor
*Assistant Examiner* — James Pontius
(74) *Attorney, Agent, or Firm* — Antonelli, Terry, Stout & Kraus, LLP.

(57) ABSTRACT

An image encoding device and corresponding decoding device are disclosed for achieving a high rate of compression. The encoding device includes an image conversion module that converts the direction of the images using right-left symmetry mode convention or up-down symmetry mode conversion. Encoding modules are used to encode both the unconverted and converted images. A mode selector module compares the quantity of codes in the encoded unconverted images and the quantity of codes in the encoded converted images, and selects codes that are smaller in the quantity of codes for output.

1 Claim, 16 Drawing Sheets

IMAGE DECODING DEVICE AND METHOD THEREOF USING INTER-CODED PREDICTIVE ENCODING CODE

CLAIM OF PRIORITY

The present application claims priority from Japanese application PCT/JP2004/006169 filed on Apr. 28, 2004, the content of which is hereby incorporated by reference into this application.

BACKGROUND

This invention relates to an image encoding device, an image encoding program and an image encoding method for encoding images, an image decoding device, a decoding program, and a decoding method for decoding encoded images, a medium recording a encoded image encoding stream, and a method of transmitting encoded image data.

As methods of recording large quantities of visual and audio information as compressed digital data and transmitting them, encoding systems including the Moving Picture Experts Group (MPEG) system have been formulated, and established as encoding systems of international standards, such as MPEG-1, MPEG-2 and MPEG-4 standards. Systems prescribed for enhancing the rate of compression include the H.264/Advanced Video Coding (AVC) standard (see Joint Video Team (JVT) of ISO/IEC MPEG & ITU-T VCEG: "Text of International Standard of Joint Video Specification", ITU-T Rec. H264|ISO/IEC 14496-10 Advanced Video Coding (December, 2003)). These systems have been adopted as encoding systems for use in digital satellite broadcasting, DVDs, cellular telephones and digital cameras among others, and are now finding even more extensive and familiar use.

Of these encoding systems, the H.264/AVC systems uses, in addition to arithmetic transform encoding techniques using motion compensative prediction and discrete cosine transform (DCT), a technique known as intra-coded predictive encoding. This technique permits prediction of the signal level from an encoded adjoining block in an intra-frame without having to use any other picture information.

FIG. 3 illustrates the intra-coded predictive encoding. The description here will refer, by way of example, to block-by-block prediction, the size of each block being 4×4 pixels, in a raster scanning system of sequentially scanning a frame rightward and downward from the top left. The signal level of a pixel 304 in a prediction block 303 (the block to be predicted) is predicted from the signal level of the boundary pixel 302 of an already encoded adjoining block 301 (the pixels adjoining the prediction block, out of the pixels of the adjoining block 301, except that a pixel on the lowest line where the block adjoining the prediction block to the upper right is concerned), and the difference between the predicted value and the actual value (residual component) is subjected to arithmetic transform encoding by DCT or otherwise. At this step, a pixel 305 of an adjoining block not yet encoded cannot be used for prediction. There are a plurality of directions of prediction (i.e. encoding modes) 306. Residual components resulting from prediction in all the directions are compared, the direction giving the smallest residual component is selected, and that residual component is subjected to arithmetic transform encoding. The direction "0:DC" here is the mode in which the average signal level of all the boundary pixels is used as the predictive value.

Incidentally, in block-by-block prediction in which the size of each block is 16×16 pixels, intra-coded predictive encoding can also be accomplished though the directions of prediction are limited.

Inter-coded predictive encoding, though similar to the conventional MPEG systems, the motion vector of each block is encoded as the difference from the upper and left side motion vectors, which are already encoded.

SUMMARY

As stated above, intra-coded predictive encoding cannot be applied to pixels of any adjoining block which is not yet encoded. For this reason, a difference in the accuracy of prediction may occur depending on the direction of prediction 306. For instance, where blocks are scanned by a raster scanning system of sequentially scanning a frame rightward and downward from the top left, the accuracy of predicting rightward and downward from the top left is high, but that of predicting leftward and downward from the top right is low. Thus, in an image in which pixels similar in signal level consecutively appear rightward and downward from the top left (left-to-right sloping image), prediction is easier and accordingly a high rate of compression can be achieved. However, prediction is more difficult for an image in which pixels similar in signal level consecutively appear leftward and downward from the top right (right-to-left sloping image), and accordingly the rate of compression is lower.

Similarly in inter-coded predictive encoding, there is directional dependence of characteristics of images subjected to raster scanning. Since the motion vector of each block is encoded as the length of difference from the motion vectors of the adjoining blocks on the left and upper sides, the closer the sequence in correlation to the motion in the rightward and downward direction, the higher the accuracy of prediction and the higher the efficiency of encoding. Further, as the selection of a context model in entropy encoding also uses information on the adjoining blocks on the left and upper sides, a similar trend is found of the accuracy of prediction.

Moreover, as only boundary pixels are used in conventional intra-coded predictive encoding, there is a problem that consecutive variations in signal level within a block cannot be predicted with a sufficiently high accuracy. Usually, the signal level of pixels varies in a gentle slope. However, in conventional intra-coded predictive encoding, boundary pixels on a block boundary are extended in prediction (i.e. the pixels to be predicted are assumed to be the same as the boundary pixels). As a result, the farther a given pixel from the boundary pixels, the greater the residual component and the greater the quantity of codes after arithmetic transform.

An object of this invention, attempted in view of the problems, is to provide an image encoding device capable of intra-coded prediction always in the direction of higher accuracy of prediction without having to alter the scanning direction by inverting the input image in the vertical or horizontal direction or rotating it at any desired angle before performing intra-coded prediction, and an image decoding device matching this encoding device.

Another object of the invention is to provide an image encoding device capable of inter-coded prediction always in the direction of higher accuracy of prediction without having to alter the scanning direction by inverting the input image in the vertical or horizontal direction or rotating it at any desired angle before performing inter-coded prediction, and an image decoding device matching this encoding device.

Still another object of the invention is to provide an image encoding device capable of realizing intra-coded prediction at high accuracy using not only boundary pixels but also pixels inside the block according to a prescribed interpolation formula when performing intra-coded prediction, and an image decoding device matching this encoding device.

According to the invention, there is provided an encoding device for encoding signals of images, comprising an image conversion module for converting the direction of the images, encoding modules for encoding the images and images converted in the direction, and a mode selector module for comparing the quantity of codes in the encoded images and the quantity of codes in the encoded images converted in the direction, selecting codes smaller in the quantity of codes, and outputting the selected codes and a flag for identifying the selected codes.

Also according to the invention, there is provided an encoding device for encoding signals of images, comprising an encoding module for calculating a first difference between information on a first pixel of a prediction area for second pixel which is in a predictive direction from the first pixel, encoding the first difference of the prediction area, calculating a predicted value calculated by applying a forward interpolation formula to information on a plurality of third pixels which are in a predictive direction from the first pixel, calculating a second difference from the predicted value and encoding the second difference of the prediction area; and a mode selector module for comparing the quantities of codes in the quantities of codes in the first and second differences of the prediction areas calculated for a plurality of the predictive directions, selecting codes smallest in the quantity of codes, and outputting the selected codes and a flag indicating which of the predictive directions the first or second difference has been calculated for the selected codes.

Therefore according to the invention, it is possible to provide an image encoding device enhanced in the rate of compression by performing intra-coded prediction and inter-coded prediction always in the direction of higher accuracy of prediction without having to alter the scanning direction, and an image decoding device matching this encoding device.

Also according to the invention, it is possible to provide an image encoding device enhanced in the rate of compression by performing highly accurate intra-coded prediction using pixels inside the block, and an image decoding device matching this encoding device.

DESCRIPTION OF THE PREFERRED EMBODIMENTS

The embodiments and advantages of this invention will be described in detail with the accompanying drawings.

Figure 1:
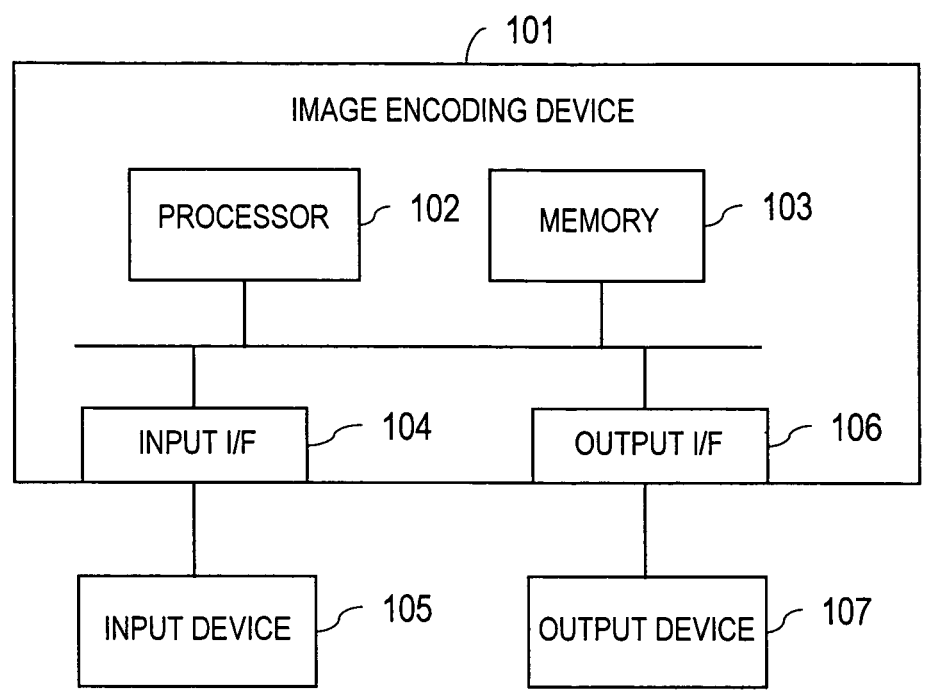
FIG. 1 is a block diagram of the hardware configuration of an image encoding device, which is a first preferred embodiment of this invention.

FIG. 1 is a block diagram of the hardware configuration of an image encoding device, which is a first preferred embodiment of this invention.

An image encoding device 101, which is the first embodiment of the invention, comprises a processor 102, a memory 103, an input interface (input I/F) 104 and an output interface (output I/F) 106 connected to permit communication among one another. The input I/F 104 is connected to an input device 105, and the output I/F 106 is connected to an output device 107.

The processor 102, intended to process image encoding according to the invention, codes data received from the input I/F 104 by executing a program stored in the memory 103, and delivers the encoded data to the output I/F 106.

Programs to be executed by the processor 102 are stored in the memory 103. Also, data to be processed by the processor 102 are temporarily stored therein.

The image encoding device 101 may be provided with a plurality each of processors 102 and memories 103. For instance, there may be a processor dedicated to execution of only a part of the processing of image encoding according to the invention. Also, a plurality of processors for performing the same processing may be provided.

The processor 102 and the memory 103 may be mounted on a single chip.

The input I/F 104 is an interface for receiving from the input device 105 image data to be processed by the processor 102.

The input device 105 is a device for entering into the input I/F 104 image signals to be processed by the image encoding device 101, and may be a video camera or a TV tuner, for instance. In this case, the input I/F 104 may be a video capture card, for example. Further, the input device 105 may be a storage device in which image data not encoded are to be stored. In this case, the input I/F 104 may be an SCSI interface, for instance.

The output I/F 106 is an interface for transmitting to the output device 107 data encoded by the processor 102.

The output device 107 is the destination to which data encoded by the image encoding device 101 are to be supplied, for instance a storage device in which encoded image data are to be stored. In this case, the output I/F 106 may be an SCSI interface, for instance. Further, the output device 107 may be a computer system connected to the output I/F 106 via a LAN, IP network or the like (not shown). In this case, the output I/F 106 is a network interface. The output device 107 may as well be an image receiver device connected to the output I/F 106 via a telephone communication network (not shown). In this case, the output I/F 106 is a transmitter of telephone signals. Or the output device 107 may be a digital TV receiver. In this case, the output I/F 106 is a transmitter of digital TV signals.

The image encoding device 101 may as well be provided with a plurality each of input I/Fs 104 and output I/Fs 106, with an input device and an output device each of a different type being connected to each input I/F 104 and output I/F 106. For instance, the image encoding device 101 may have two output I/Fs 106, a hard disk device being connected to one of them, and a magneto-optical disk device being connected to the other. Or a hard disk device may be connected to one of them, and a computer system may be connected to the other via a LAN or the like.

Figure 2:
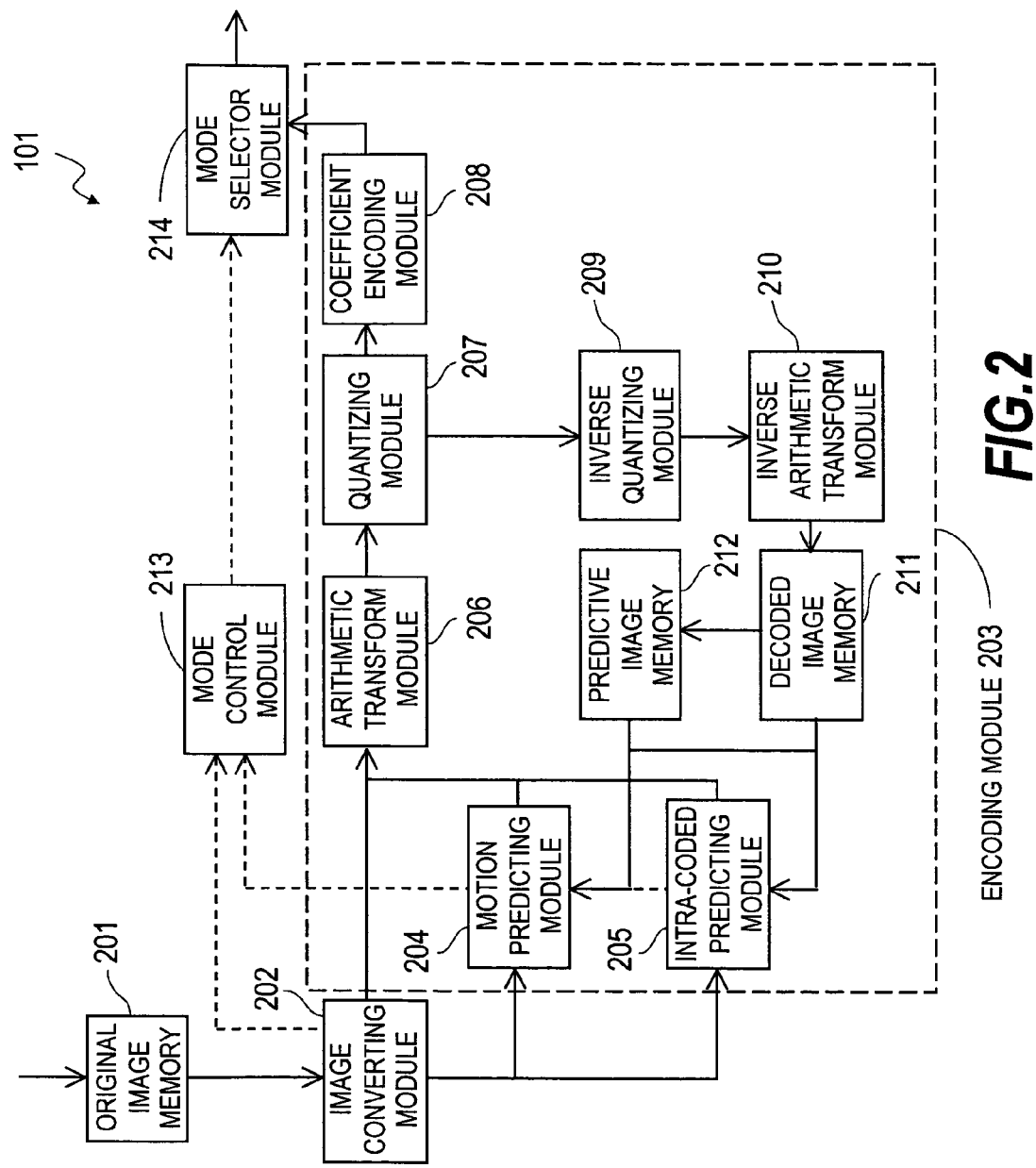
FIG. 2 is a block diagram of the functions of the image encoding device, which is the first preferred embodiment of the invention.

FIG. 2 is a block diagram of the functions of the image encoding device 101, which is the first preferred embodiment of the invention.

The image encoding device 101 comprises an original image memory 201, an image converting module 202, an encoding module 203, a mode control module 213 and a mode selector module 214. The original image memory 201 here is a partial area of the memory 103, and the image converting module 202, the mode control module 213 and the mode selector module 214 are programs stored in the memory 103 and to be executed by the processor 102. The encoding module 203 comprises a motion predicting module 204, an intra-coded predicting module 205, an arithmetic transform module 206, a quantizing module 207, a coefficient encoding module 208, an inverse quantizing module 209 and an inverse arithmetic transform module 210, which are programs to be executed by the processor 102, and a decoded image memory 211 and a predictive image memory 212, which are a partial area of the memory 103.

Next will be described the functions of the individual modules of the image encoding device 101 along the procedure of encoding an image.

The original image memory 201 temporarily buffers the original image to be encoded. Next, the image converting module 202 processes conversion of the whole or part of the frame of the image acquired from the original image memory 201. Part of the frame in this context may be one of macroblocks or blocks of a prescribed size into which the frame is divided or a prescribed rectangular area. Usually, the unit of encoding is a macro-block.

The image converting module 202 may divide the data having undergone conversion processing of the whole frame into macro-blocks and transmit those macro-blocks to the encoding module 203, or subject the macro-blocks into which the frame has been divided to conversion processing. Information regarding whether or not conversion processing has been done is transmitted to the mode control module 213.

The conversion processing performed by the image converting module 202 is processing to convert the direction of images. Processing to convert the direction of images is, for instance, axial symmetry conversion or point symmetry conversion. Axial symmetry conversion means, for instance, right-left symmetry conversion by which the frame is inverted laterally or up-down symmetry conversion by which the frame is inverted vertically. Point symmetry conversion means, for instance, rotational conversion by which the frame is rotated. The image converting module 202 may combine these modes of conversion. The following description will refer to, by way of example, a case in which subjecting the whole images to right-left symmetry conversion and not subjecting it to such conversion is compared and what involves a smaller quantity of codes is selected.

The encoding module 203 acquires from the image converting module 202 images subjected to right-left symmetry conversion and images not subjected to such conversion, and sequentially codes each image. Or a plurality of encoding modules 203 may be provided, and each image may be encoded by two encoding modules 203 in parallel. Where a plurality of encoding modules 203 are provided, the image encoding device 101 is provided with a plurality of processors 102 dedicated to the execution of programs of the encoding modules 203.

The motion predicting module 204 subjects the images acquired from the image converting module 202 to inter-frame prediction by using images from the predictive image memory 212 and the decoded image memory 211, transmits information on motion vectors and the like to the mode control module 213, and transmits to the arithmetic transform module 206 the residual component of the encoded block obtained by prediction.

The intra-coded predicting module 205 subjects the images acquired from the image converting module 202 to intra-coded prediction by using images from the decoded image memory 211, transmits information on modes and the like to the mode control module 213, and transmits to the arithmetic transform module 206 the residual component of the encoded block obtained by prediction.

The arithmetic transform module 206, the quantizing module 207 and the coefficient encoding module 208 are the same as their respective counterparts in conventional encoding devices, and respectively perform DCT operation, quantization of conversion coefficients and conversion of coefficients into codes. The inverse quantizing module 209 and the inverse arithmetic transform module 210, which also are the same as their respective counterparts in conventional encoding devices, return encoded data into image information by inverse conversion, and store the resultant information into the decoded image memory 211 and the predictive image memory 212.

The mode control module 213 manages the encoding mode in the whole image (frame) and macro-blocks on the way of encoding. Regarding the whole image, it holds an encoding process for images having undergone conversion processing and one for images not having undergone conversion processing. Thus it holds items of information referenced for motion prediction (including motion vectors and information on the reference frame) and information on the intra-coding mode (direction on the intra-coded prediction side) among others with respect to each of the case in which conversion processing has been performed and that in which no conversion processing has been performed. Regarding macro-blocks, it holds information as to whether the current macro-block is to undergo intra-coding or inter-frame prediction encoding and information related to them concerning the intra-coding mode, motion vectors and reference frames among others. The mode control module 213 transmits these items of information to the mode selector module 214.

The mode selector module 214 composes encoded data of images from information on encoded data and encoding modes regarding the whole image and macro-blocks on the way of encoding, and outputs the data so composed. It compares the overall quantity of codes in the case of encoding through conversion processing by the image converting module 202 with the quantity of codes in the case of encoding without conversion processing, and outputs codes of the smaller quantity as a stream. Further a flag indicating whether or not conversion processing has been performed and, where a partial area of an image has been converted, positional information on that area, are added to the stream as data.

It is sufficient for the flag indicating whether or not conversion processing has been performed to have one bit each for right-left symmetry conversion and up-down symmetry conversion. In the case of rotational conversion, if the number is to be increased by 1 for every 90-degree rotation, two bits will be sufficient for expressing a 360-degree rotation.

Figure 4:
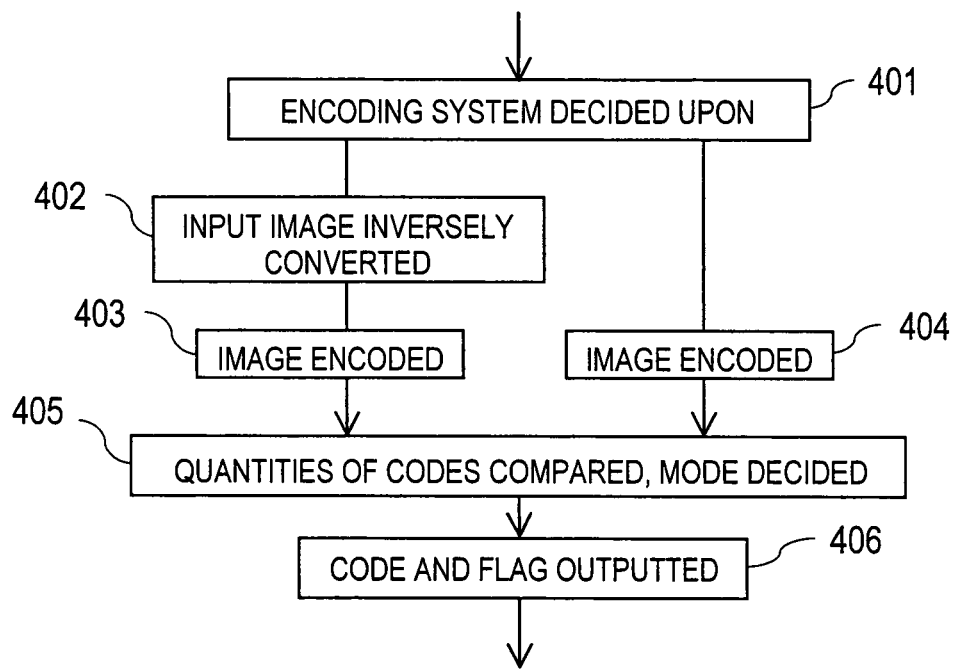
FIG. 4 illustrates the procedure of image encoding by the first preferred embodiment of the invention.

FIG. 4 illustrates the procedure of image encoding by the first preferred embodiment of the invention.

First, the image converting module 202 decides on the encoding system (step 401). Thus, it decides on whether to apply conversion processing to the whole frame or macro-block by macro-block. The following description will refer to a case in which the whole frame is to be converted by way of example. The process of performing conversion processing goes advances to step 402 while that of not performing conversion processing goes to step 404.

At step 402, the image converting module 202 converts the input image. Thus the image is subjected frame by frame to right-left symmetry conversion, up-down symmetry conversion, rotational conversion and so forth. Then the sequence advances to step 403.

At step 403 and step 404, the encoding module 203 codes the image. This encoding was already described with reference to FIG. 2.

Next, the mode selector module 214 compares the quantities of codes and decides on the mode (step 405). Thus, as described with reference to FIG. 2, it compares the quantities of codes obtained by encoding between process of having performed conversion processing and that of not having performed conversion processing, and decides to output data of the smaller quantity of codes.

Then, the mode selector module 214 outputs a code and a flag (step 406). As described with reference to FIG. 2, it outputs as a stream the flag indicating whether or not conversion processing has been performed, positional information on the partial area of an image has been converted if any, and the selected encoded data. The processing of encoding is thereby completed.

Figure 5:
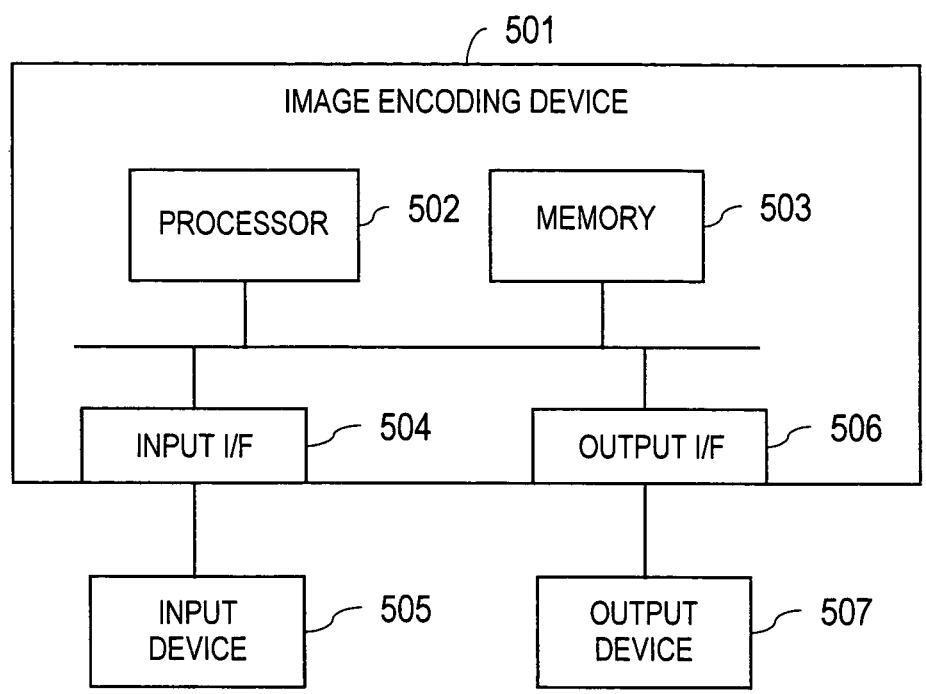
FIG. 5 is a block diagram of the hardware configuration of an image decoding device, which is a second preferred embodiment of the invention.

FIG. 5 is a block diagram of the hardware configuration of an image decoding device, which is a second preferred embodiment of the invention.

An image decoding device 501, which is the second preferred embodiment of the invention, comprises a processor 502, a memory 503, an input interface (input I/F) 504 and an output interface (output I/F) 506, connected to permit communication among one another. The input I/F 504 is connected to an input device 505, and the output I/F 506 is connected to an output device 507.

The processor 502, intended to process image decoding according to the invention, decodes data received from the input I/F 504 by executing a program stored in the memory 503, and delivers the decoded data to the output I/F 506.

Programs to be executed by the processor 502 are stored in the memory 503. Also, data to be processed by the processor 502 are temporarily stored therein.

The image encoding device 501 may be provided with a plurality each of processors 502 and memories 503. For instance, there may be a processor dedicated to execution of only a part of the processing of image decoding according to the invention.

The processor 502 and the memory 503 may be mounted on a single chip.

The input I/F 504 is an interface for receiving from the input device 505 image data to be processed by the processor 502.

The input device 505 is a device for entering into the input I/F 504 encoded data to be processed by the image decoding device 501, and may be a storage device in which encoded image data are to be stored. In this case, the input I/F 504 may be an SCSI interface, for instance. Further, the input device 505 may be a computer system connected to the input I/F 504 via a LAN, IP network or the like (not shown). In this case, the input I/F 504 is a network interface. The input device 505 may as well be an image data transmitter device connected to the input I/F 504 via a telephone communication network (not shown). In this case, the input I/F 504 is a receiver of telephone signals. Or the input device 505 may be a digital TV broadcast station. In this case, the input I/F 504 is a digital TV tuner.

The output I/F 506 is an interface for transmitting to the output device 507 data decoded by the processor 502.

The output device 507 is the destination to which data decoded by the image decoding device 501 are to be supplied, for instance a display on which images are to be displayed. In this case, the output I/F 506 may be a video card, for instance. Further, the output device 507 may be a storage device in which decoded data are to be stored in a stream. In this case, the output I/F 506 is a SCSI interface.

The image decoding device 501 may as well be provided with a plurality each of input I/Fs 504 and output I/Fs 506, with an input device and an output device each of a different type being connected to each input I/F 504 and output I/F 506. For instance, the image encoding device 501 may have two output I/Fs 506, a hard disk device being connected to one of them, and an optical disk device being connected to the other. Or a hard disk device may be connected to one of them, and a computer system may be connected to the other via a LAN or the like.

Figure 6:
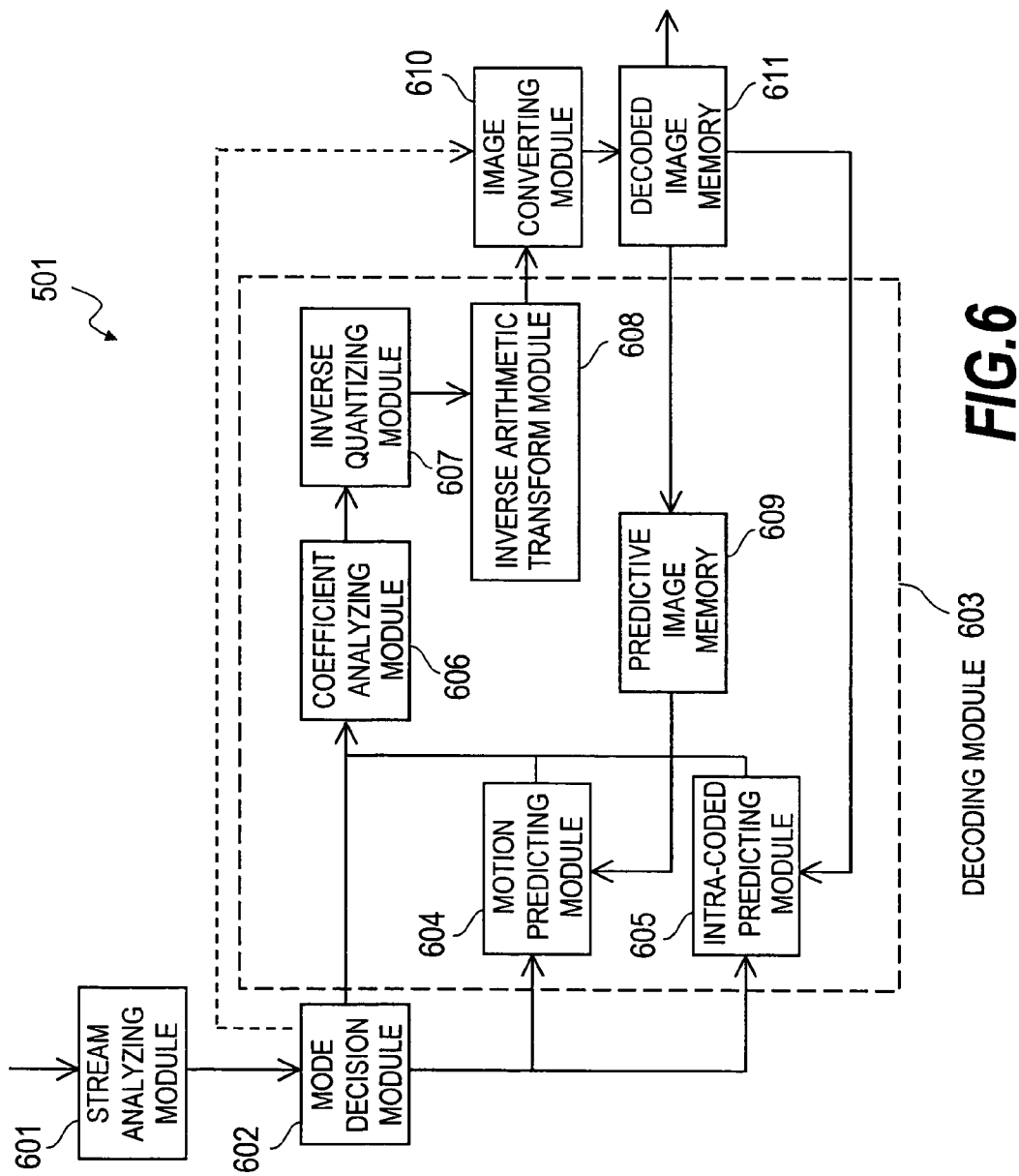
FIG. 6 is a block diagram of the functions of the image decoding device, which is the second preferred embodiment of the invention.

FIG. 6 is a block diagram of the functions of the image decoding device 501, which is the second preferred embodiment of the invention.

The image decoding device 501 comprises a stream analyzing module 601, a mode decision module 602, a decoding module 603, an image converting module 610 and a decoded image memory 611. The stream analyzing module 601, the mode decision module 602, the decoding module 603 and the image converting module 610 here are programs stored in the memory 503 and to be executed by the processor 502, and the decoded image memory 611 is a partial area of the memory 103. Further, the decoding module 603 comprises a motion predicting module 604, an intra-coded predicting module 605, a coefficient analyzing module 606, an inverse quantizing module 607 and an inverse arithmetic transform module 608, which are programs to be executed by the processor 502, and a predictive image memory 609, which is a partial area of the memory 503.

The decoding device 501, which is the second embodiment of the invention, can decode a stream encoded by the image encoding device 101, which is the first embodiment. Next, the functions of the different modules of the image decoding device 501 will be described along the procedure of decoding the encoded stream.

The stream analyzing module 601 analyzes the data of the inputted encoded stream, and transmits to the mode decision module 602 information on flags and data. The stream analyzing module 601 analyzes the data of the stream and flags created by the encoding device 101.

Then, the mode decision module 602 controls modes regarding motion prediction, intra-coded prediction and image conversion on the basis of the information analyzed by the stream analyzing module 601. If a flag indicating that the image was subjected at the time of encoding to conversion processing such as inversion, rotation or the like is attached to the stream, information on the type of conversion processing performed (for instance, information on whether or not right-left symmetry conversion has been performed) is transmitted to the image converting module 610.

The motion predicting module 604 performs inter-frame prediction by using information including motion vectors transmitted from the mode decision module 602 and images from the predictive image memory 609 and the decoded image memory 611, and transmits predictive information to the coefficient analyzing module 606.

The intra-coded predicting module 605 performs intra-coded prediction by using information including the intra-coding mode transmitted from the mode decision module 602 and images from the decoded image memory 611, and transmits predictive information to the coefficient analyzing module 606.

The coefficient analyzing module 606, the inverse quantizing module 607 and the inverse arithmetic transform module 608 are the same as their respective counterparts in conventional decoding devices, and respectively perform synthesis of predictive information and coefficient information, inverse quantization of conversion coefficients and DCT operation.

The image converting module 610 subjects to conversion processing the whole frame or part of the decoded image in accordance with information transmitted from the mode decision module 602. Thus it performs processing to undo the conversion processing performed by the image converting module 202 of the encoding device 101 shown in FIG. 1 and FIG. 2 above.

The decoded image memory 611 stores decoded images having gone through conversion processing by the image converting module 610, and transmits those images to the output device 507 to have the decoded images displayed on a screen or supplied to a stream.

Figure 7:
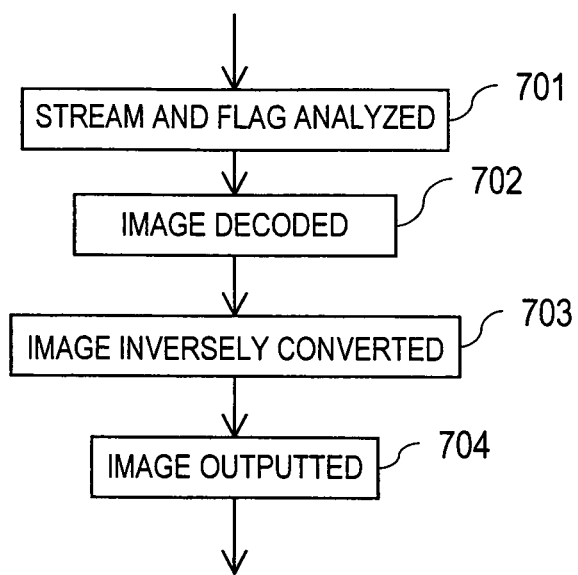
FIG. 7 illustrates the procedure of image decoding by the second preferred embodiment of the invention.

FIG. 7 illustrates the procedure of image decoding by the second preferred embodiment of the invention.

First, the stream analyzing module 601 and the mode decision module 602 analyze the stream and the flag (step 701). Then, the decoding module 603 decodes the image (step 702). Next, the image converting module 610 converts the decoded image, and stores it into the decoded image memory 611 (step 703). Finally, images stored in the decoded image memory 611 are outputted for displaying or stream recording (step 704). The processing of decoding is thereby completed. Incidentally, since particulars of the processing by the above-described modules were already stated with reference to FIG. 6, their detailed description will be dispensed with here.

The image encoding device 101 of the first embodiment of the invention and the image decoding device 501 of the second embodiment described above may be packaged as the same hardware unit. In this case, the programs described with reference to FIG. 2 and FIG. 6 are stored in the memory 103 (or the memory 503), wherein the areas described with reference to FIG. 2 and FIG. 6 are secured.

Thus, the first and second embodiments of the invention can respectively provide an image encoding device capable of reducing the quantities of codes after encoding (i.e. achieving a higher rate of compression) by performing intra-coded prediction always in the direction of higher accuracy of prediction without having to alter the scanning direction, and an image decoding device matching this encoding device. As a result, the quantity of codes can be reduced by about 10% at the maximum compared with conventional intra-coded prediction. The quantity of codes, however, is not reduced always at a constant rate because it varies with the particulars of the original image.

Figure 8:
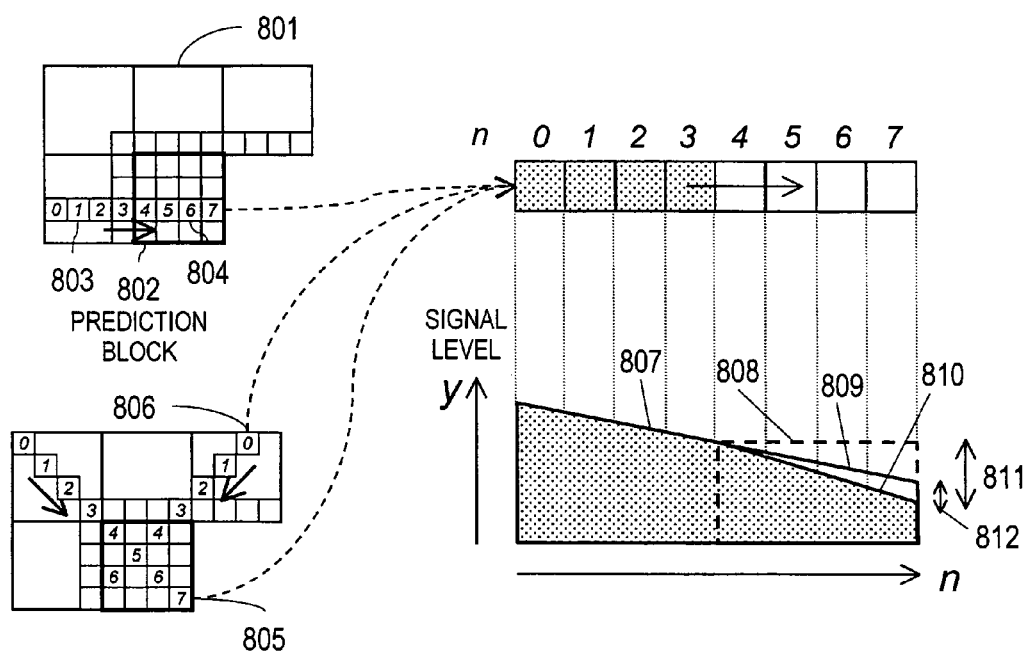
FIG. 8 illustrates an intra-coded predicting method in a third preferred embodiment of the invention.

FIG. 8 illustrates an intra-coded predicting method in a third preferred embodiment of the invention.

This embodiment provides a method which uses, in predicting the signal level of the pixels of a prediction block 802 not only the signal level of the boundary pixel but also the signal level of pixels of the whole of the already encoded adjoining block 801, and is used by the intra-coded predicting modules 205 and 605 of FIG. 2 and FIG. 6, respectively. The "prediction block" here means a block which is the object of encoding but not yet encoded yet, and the "adjoining block" means an encoded block adjoining the prediction block.

Figure 3:
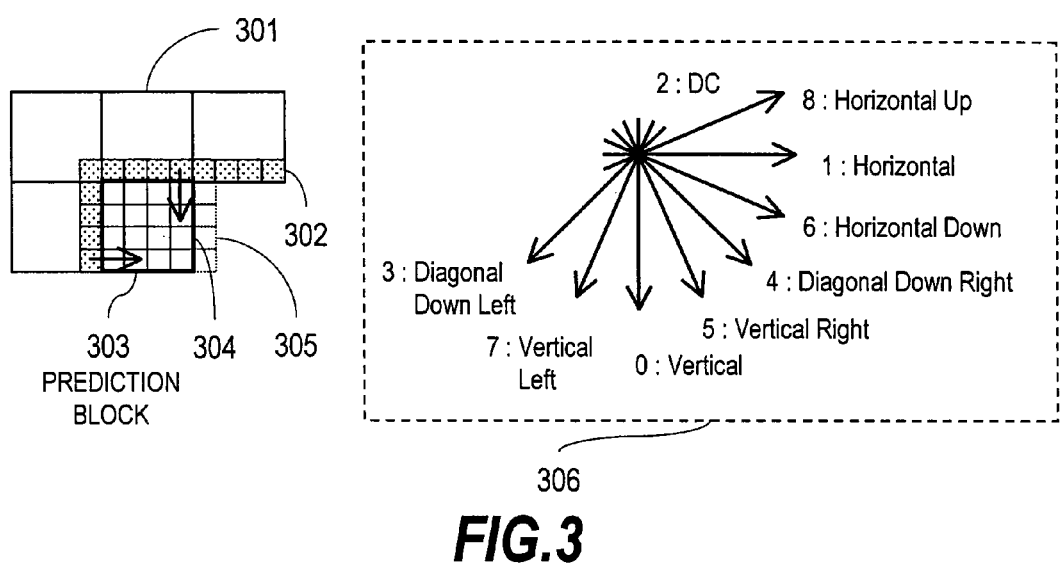
FIG. 3 illustrates intra-coded predictive encoding.

The directions of prediction are shown in 306 in FIG. 3. Although the description of this embodiment will limit itself to prediction in only some of these directions for the sake of brevity, actual prediction is performed in all the directions of prediction 306 and the direction in which the residual component is the smallest is selected. Prediction in this context means a procedure, where it refers to encoding, of encoding the difference (residual component) between the actual signal level of pixels in the prediction block 802 and a predicted value calculated from the signal level of pixels in the adjoining block used for prediction. On the other hand, where it refers to decoding, prediction means a procedure of obtaining a decoded image by adding a decoded residual component to a predicted value calculated in the same way. The procedure of encoding will be described below.

Any conventional intra-coded predicting method uses boundary pixels alone. Where, for instance, prediction is to be done in the vertical direction, prediction is done in the downward direction by using the boundary pixels (pixels of the lowest line) of the adjoining block 801 right above the prediction block 802. Thus, the prediction block 802 is divided into four rows and, from the value of the signal level of each pixel, the value of the signal level of the boundary pixels bordering above the row including that pixel is subtracted. Where prediction is to be done in the horizontal direction, similarly prediction is done in the rightward direction by using the boundary pixels (pixels of the rightmost line) of the adjoining block bordering the prediction block on the left. Thus, the prediction block 802 is divided into four rows and, from the signal level of each pixel, the value of the signal level of the boundary pixels bordering the row including that pixel on the left is subtracted. Thus in prediction in either of the directions mentioned above, the signal level of the pixels of the prediction block is predicted to be the same as the signal level of the boundary pixels, and the difference (residual component) between the predicted value and the actual value is calculated.

On the other hand, the intra-coded predicting method provided by the third preferred embodiment of the invention, is a predicting method using composite pixels including not only boundary pixels but also pixels inside adjoining blocks. The composite pixels here mean pixels in a plurality of blocks used in the prediction of pixels in the prediction block. Where prediction is to be done in the horizontal direction for instance, composite pixels constitute one line (803) of the block adjoining the line to be predicted. In this case, the predicted value is calculated from the value of the composite pixels 803 by an interpolation formula, and the values of the pixels of one of the adjoining prediction block are predicted. This prediction uses, for instance, Newton's forward interpolation formula. By way of example, a case in which the composite pixels of the adjoining block and the pixels to be predicted of the prediction block are assigned numbers n of 0 to 7, the signal level of a pixel n is supposed to be yn, and n=4, 5, 6, 7 (uncoded) is to be figured out from n=0, 1, 2, 3 (coded). In this calculation, the predicted signal level value yn of the pixel n is obtained by Equation (1).

The residual component is figured by subtracting the predicted value, calculated by Equation (1), from the value of the pixel of the prediction block. If n=7 for instance, the residual component of pixel 7 is the remainder of the subtraction of y7 from the actual value of pixel 7. Where prediction is to be done diagonally, similarly numbers n (n=0 to 7) are assigned to the pixels to be predicted of the prediction block and the pixels of the adjoining block, which constitute the basis of prediction, and the predicted value is calculated by Equation (1) (805). If the pixels to be predicted are less than four, the calculation should be done in a more narrowly limited range of n. For instance, if there are three pixels to be predicted, the range of n should be reduced to 0 to 6 (806).

$$y_n = y_0 + nD_0 + n(n-1)D_1 + n(n-1)(n-2)D_2 \quad (1)$$

$$D_0 = y_1 - y_0$$

$$D_1 = \frac{1}{2}(y_2 - 2y_1 + y_0)$$

$$D_2 = \frac{1}{6}(y_3 - 3y_2 + 3y_1 - y_0)$$

Whereas Equation (1) is a formula applicable to a block size of 4×4 pixels, the predicting method provided by this embodiment can also be applied to other block sizes (e.g. 16×16 pixels). Generally regarding pixels numbered from 0 to n, where the values of signal levels of pixels m+1 to n are to be predicted from the values of known signals of pixels 0 to m, the predicted value y can be obtained by Equation 2, wherein nCj is a two-term coefficient.

$$y_n = y_0 + \sum_{j=1}^{m} {}_nC_j \sum_{i=0}^{j} {}_jC_i(-1)^{j-i} y_i \quad (2)$$

$${}_jC_i = \frac{n!}{j!(n-j)!}$$

Next, the residual from the conventional predicting method will be compared with that from the predicting method provided by this embodiment. A signal level 808 according to the conventional predicting method is the same as the signal level of pixel 3 (boundary pixel). On the other hand, a signal level 809 according to the predicting method provided by this embodiment is a value calculated by Equation (1).

For instance, when the signal level of pixels 0 to 3 varies at a certain rate, often the actual signal level 810 of pixels 4 to 7 also varies at a rate close to that level. Thus, the actual signal level 810 is often close to the signal level 809 according to the predicting method provided by this embodiment than to the signal level 808 according to the conventional predicting method. As a result, a residual 812 according to the predicting method provided by this embodiment becomes smaller than a residual 811 according to the conventional predicting method, and therefore a smaller quantity of codes for this embodiment. Incidentally, though Equations (1) and (2) use the signal level of all the known pixels for prediction, prediction is also possible by using the signal level of only some of the pixels.

To add, the method of least squares can as well be used for this embodiment of the invention. In this case, a linear equation inferred from a known signal level by the method of least squares is used. For instance, when the signal level yn of pixel n at n=4, 5, 6, 7 is to be obtained on the basis of the known signal level yn of pixel n at n=0, 1, 2, 3 as in the above-described case, Equation (3) is used. Here, m represents the number of pixels which is the basis of prediction, and m=4 holds in this example.

$$y_n = an + b \quad (3)$$

$$a = \frac{\sum_{i=0}^{m-1}(y_i - \bar{y})(i - \bar{n})}{\sum_{i=0}^{m-1}(i - \bar{n})^2}$$

$$b = \bar{y} - a\bar{n}, \quad \bar{y} = \frac{1}{m}\sum_{i=0}^{m-1} y_i$$

$$\bar{n} = \frac{1}{m}\sum_{i=0}^{m-1} i$$

Figure 9:
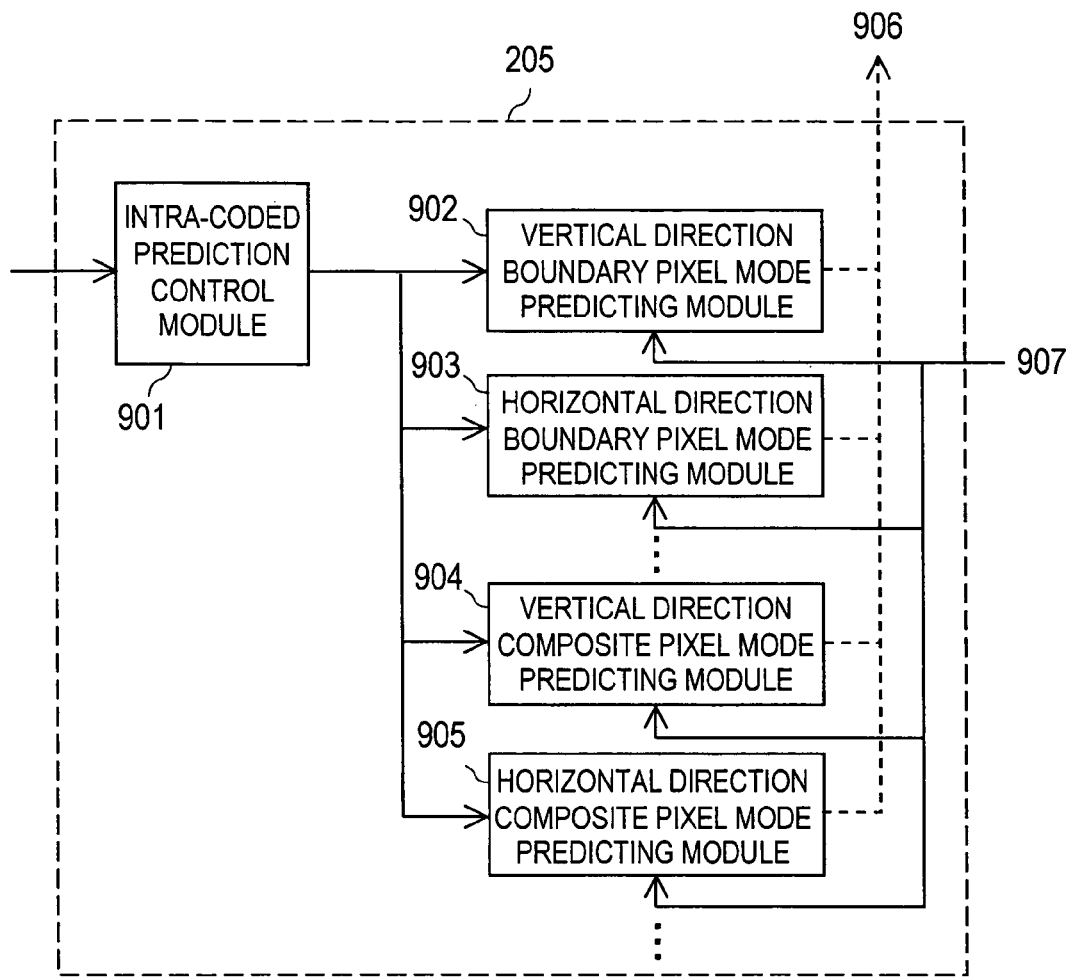
FIG. 9 is a block diagram of the functions of the intra-coded predicting module to which the intra-coded predicting method is applied in the third preferred embodiment of the invention.

FIG. 9 is a block diagram of the functions of the intra-coded predicting module 205 to which the intra-coded predicting method is applied in the third preferred embodiment of the invention.

The intra-coded predicting module 205 in this embodiment determines the intra-coding mode of the prediction block (i.e. the direction of prediction 306 of FIG. 3 above) on the basis of information 907 on the signal level of the already encoded adjoining block, performs prediction processing, and transmits the encoding mode and information 906 on the residual component to the mode control module 213 and the arithmetic transform module 206.

The intra-coded predicting module 205 comprises an intra-coded prediction control module 901 and a plurality of predicting modules each matching one or another of the encoding modes. This plurality of predicting modules are classified into what performs conventional prediction using boundary pixels and what predicts by this embodiment using composite pixels, each including what predicts in each of the directions of prediction 306 shown in FIG. 3.

For the sake of brevity of description, FIG. 9 shows only a vertical direction boundary pixel mode predicting module 902 which predicts in the vertical direction ("0:Vertical" in FIG. 2) using boundary pixels, a horizontal direction boundary pixel mode predicting module 903 which predicts in the horizontal direction ("1:Horizontal" in FIG. 2) using boundary pixels, a vertical direction composite pixel mode predicting module 904 which predicts in the vertical direction using composite pixels, and a horizontal direction composite pixel mode predicting module 905 which predicts in the horizontal direction using composite pixels, but actually a predicting module using boundary pixels and a predicting module using composite pixels are provided for each of the other directions of prediction 306 in FIG. 2.

The intra-coded prediction control module 901 manages the intra-coded predicting method. Thus it checks whether or not blocks adjoining the prediction block can be used, and controls information for intra-coded prediction.

Each of the mode predicting modules 902 to 905 predicts the signal level of pixels of the prediction block from the signal level of pixels of adjoining blocks, and calculates residual components relative to the signal level of actual pixels. Next, information on the mode in which the calculated residual component is the smallest is transmitted to the mode control module 213, and the residual component calculated in that mode is transmitted to the arithmetic transform module 206.

The vertical direction boundary pixel mode predicting module 902 predicts in the downward direction by using the boundary pixels of the adjoining block above the prediction block. The horizontal direction boundary pixel mode predicting module 903 predicts rightward by using the boundary pixels of the adjoining block to the left of the prediction block.

The vertical direction composite pixel mode predicting module 904 and the horizontal direction composite pixel mode predicting module 905 perform intra-coded prediction by using composite pixels of this embodiment. The vertical direction composite pixel mode predicting module 904 calculates the predicted value of the signal level by Equation (1) or Equation (2) by using composite pixels of the adjoining block above the prediction block (i.e. boundary pixels and inside pixels) to figure out residual components relative to the actual signal level. The horizontal direction composite pixel mode predicting module 905 calculates the predicted value of the signal level by Equation (1) or Equation (2) by using composite pixels of the adjoining block to the left of the prediction block to figure out residual components relative to the actual signal level.

Figure 10:
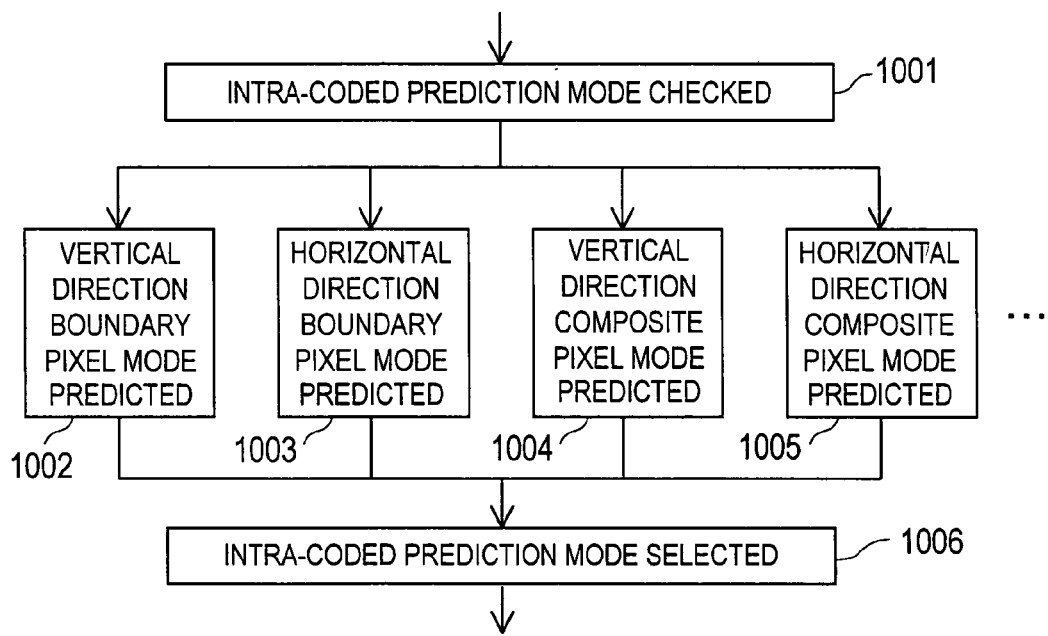
FIG. 10 illustrates the procedure of intra-coded prediction in the third preferred embodiment of the invention.

FIG. 10 illustrates the procedure of intra-coded prediction in the third preferred embodiment of the invention.

First, the intra-coded prediction control module 901 checks the intra-coded prediction mode (step 1001). Thus, it decides whether or not the pixels of the adjoining blocks can be used and, on the basis of the result of that decision, specifies pixels to be used for prediction in the applicable directions of prediction 306 and each of the directions of prediction 306.

Next, intra-coded prediction is performed regarding the directions of prediction 306 to which the mode predicting modules 902 to 905 are applicable. In the procedure of FIG. 10, prediction using conventional boundary pixels and prediction using the composite pixels of this embodiment are performed both in the vertical direction and in the horizontal direction (steps 1002 to 1005).

Then, the optimal intra-coded prediction mode is selected on the basis of prediction results from steps 1002 to 1005 (step 1006). The total of residual components relative to different pixels in each mode is calculated as a result of prediction at steps 1002 to 1005. As the smaller this total, the smaller the quantity of codes after encoding, the mode which gives the smallest total of residual components is selected as the optimal mode. Next, the selected residual components are transmitted to the arithmetic transform module 206, and information on the selected mode is transmitted to the mode control module 213. For even more accurate decision, the mode selector module 214 may selected as the optimal mode the mode which gives the smallest total of residual components after arithmetic transform by the arithmetic transform module 206. Processing of intra-coded prediction is completed hereupon.

The mode selector module 214 adds to the stream of codes to be outputted a flag indicating the selected optimal mode.

To add, though prediction in only the vertical direction and the horizontal direction is included in the procedure illustrated in FIG. 10 for the sake of brevity of description, actually prediction is performed in every direction of prediction which the intra-coded prediction control module 901 has determined to be applicable, and the optimal mode is selected from the result.

While the image encoding device 101 was described with reference to FIG. 9 and FIG. 10, the intra-coded predicting method provided by this embodiment can be similarly applied to the image decoding device 501. In this case, the intra-coded predicting module 605 is provided with, in addition to the conventional boundary pixel mode predicting module, a composite pixel mode predicting module for each of the directions of prediction 306. By performing intra-coded prediction in the predicting mode for the inputted encoded data, an image decoding device 501 matching the intra-coded predicting method provided by this embodiment can be realized.

Thus, the mode decision module 602 references the flag attached to the image stream to be decoded, and determines the intra-coded prediction mode selected at the time of encoding the image. Next, the intra-coded predicting module 605 performs prediction in the determined intra-coded prediction mode and decodes the image. For instance, if the image to be decoded is encoded in the boundary pixel mode in the rightward direction, the signal level of pixels of the prediction block will be predicted to be the same as that of the boundary pixels of the adjoining block to the left of the prediction block, and decoding will be performed on that basis. Or if the image to be decoded is encoded in the composite pixel mode in the rightward direction for instance, the predicted value of the signal level of the pixels of the prediction block is calculated by applying Equation (1) to the composite pixels of the adjoining block to the left of the prediction block, and decoding will be performed on that basis.

The third embodiment of the invention so far described can provide an image encoding device can reduce the quantity of codes after encoding (i.e. raise the rate of compression) by performing highly accurate intra-coded prediction by using composite pixels (pixels inside the block), and an image decoding device matching this encoding device.

Figure 11:
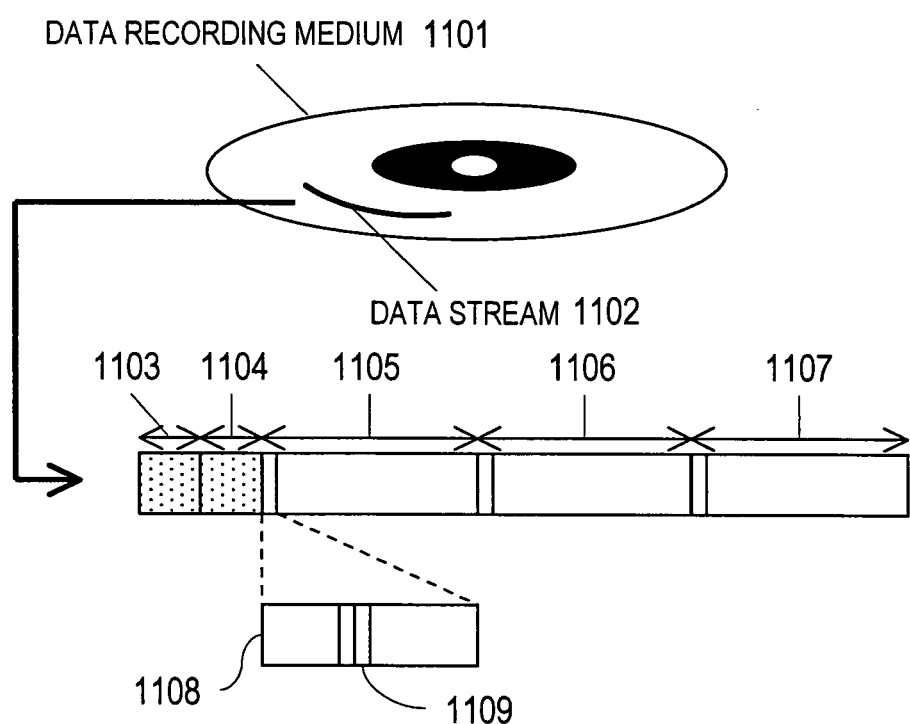
FIG. 11 illustrates a data recording medium in a fourth preferred embodiment of the invention.

FIG. 11 illustrates a data recording medium in a fourth preferred embodiment of the invention.

A data recording medium 1101 is a recording medium for use where the output device 107 or the input device 505 is a storage device, and may be a magnetic disk for instance. Encoded data created by the image encoding device 101 of the first embodiment of the invention are recorded on the data recording medium 1101 as a data stream 1102. The data stream 1102 is recorded as an encoded stream conforming to a certain grammar. An example of the H.264/AVC standard will be described below.

According to H.264/AVC, a stream comprises a sequence parameter set 1103, a picture parameter set 1104 and slices 1105, 1106 and 1107. The following description will refer, by way of example, to a case in which one image (frame) is stored in each slice.

In a stream where the whole frame has been subjected to conversion processing including right-left symmetry conversion, up-down symmetry conversion or rotational conversion, a slice header 1108 is recorded at the leading edge of the slice 1105, and information 1109 on a flag and the like related to conversion processing is stored within the slice header 1108. The contents of this information include a flag indicating whether or not conversion processing has been performed and, where a partial area of the image has been converted, positional information and the like on that partial area. For the flag indicating whether or not conversion processing has been performed, one bit will be sufficient for each of right-left symmetry conversion and up-down symmetry conversion. In rotational conversion, if the number is to be increased by 1 for every 90-degree rotation clockwise, two bits will be sufficient for expressing a 360-degree rotation. The positional information concerning the area in which conversion processing has taken place includes such items as abscissas and ordinates in the image, its width and height. Where conversion processing is to be performed macro-block by macro-block, these items of information can be stored in the part where the flag of each macro-block is to be recorded in place of a slice header.

Regarding the flag indicating whether or not conversion processing has been performed, flags for indicating such information as conversion processing performed only on the intra-coded prediction frame together with that, conversion processing performed also on the inter-coded prediction frame, or conversion processing performed in group-of-pictures (GOP) units may also be stored. To add, an embodiment in which conversion is processed on the inter-coded prediction frame will be described afterwards.

Further, where the intra-coded predicting method provided by the third embodiment of the invention is to be applied, a new mode in which composite pixels are used in the encoded stream of the H.264/AVC standard is added. In this case, numerical values representing the new mode are added to the information 1109 on the conventional flags and the like, and stored. Regarding the form of expressing the new mode may be the addition of bits indicating the use of composite pixels or the allocation of numerical values where mode prediction using composite pixels is performed.

Figure 12:
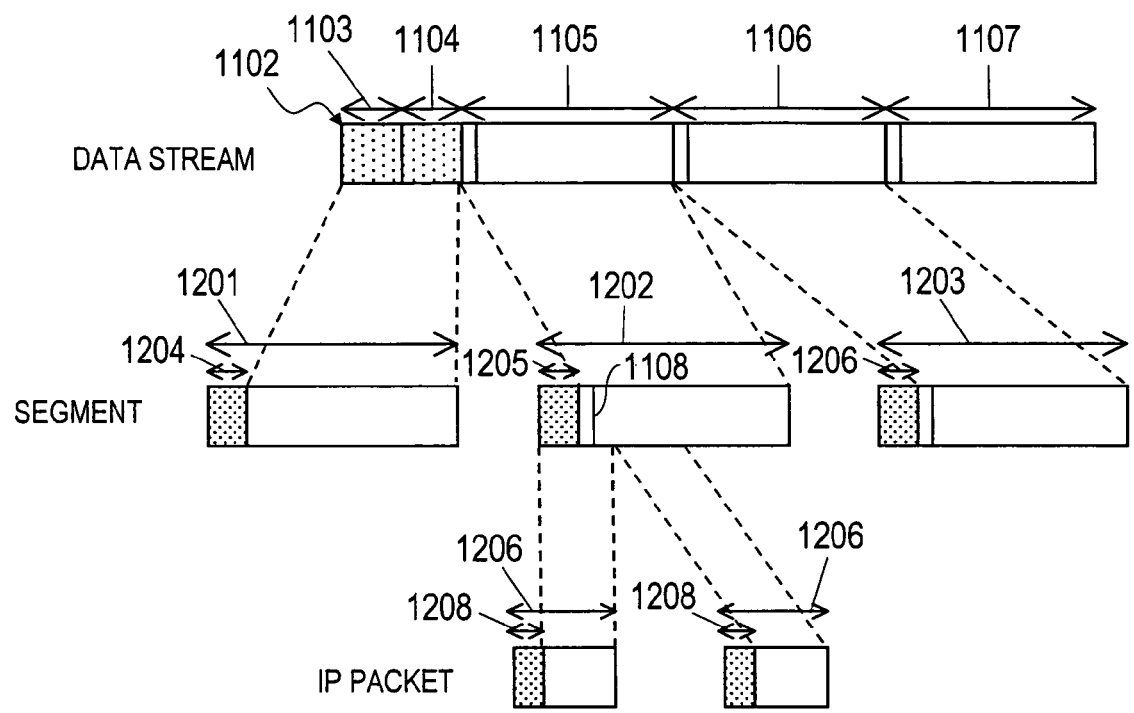
FIG. 12 illustrates a packet in a fifth preferred embodiment of the invention.

FIG. 12 illustrates a packet in a fifth preferred embodiment of the invention.

FIG. 12 shows, by way of example, the procedure of generating from the data stream 1102 of FIG. 11 an IP packet to be transmitted by the output I/F 106 of the image encoding device 101 to an IP network.

First, the data stream 1102 is divided into TCP segments 1201 to 1203 of a prescribed size, to which TCP headers 1204 to 1206 are respectively assigned. FIG. 12 shows an example in which one segment is generated from one slice. In this case, the slice header 1108 contained in each slice is also included in a segment. As described with reference to FIG. 11, the information 1109 on the flags and the like related to conversion processing is stored inside the slice header 1108. Though description with reference to FIG. 12 is dispensed with, segments are also generated similarly in the slices 1107 onward.

Then, each segment is divided into IP packets of a prescribed size, each with an IP header. For instance, the segment 1202 is divided into IP packets 1207 and 1208 of a prescribed size, to which IP headers 1209 and 1210 are respectively assigned. Though only the IP packets 1207 and 1208 generated from part of the segment 1202 are shown here, IP packets are similarly generated from the whole segment 1202 as well. Further, though description with reference to FIG. 12 is dispensed with, other segments 1201 onward are similarly divided to generate IP packets.

The IP packets 1209 and so forth are generated by the output I/F 106 of the image encoding device 101 for instance, and transmitted to the output device 107 via the IP network (not shown).

Also, the IP packets 1209 and so forth may as well be transmitted from a packet transmitter device (not shown) which is equipped with a storage device, wherein the data stream 1102 is stored and an output interface for generating the IP packets 1209 and so forth from the data stream 1102 and transmitting them, but has no image encoding function.

In the same way as illustrated in FIG. 12, the image encoding device 101 or the packet transmitter device may as well wireless packets from the data stream 1102, and transmit them to the output device 107 via a wireless packet communication network.

Figure 13:
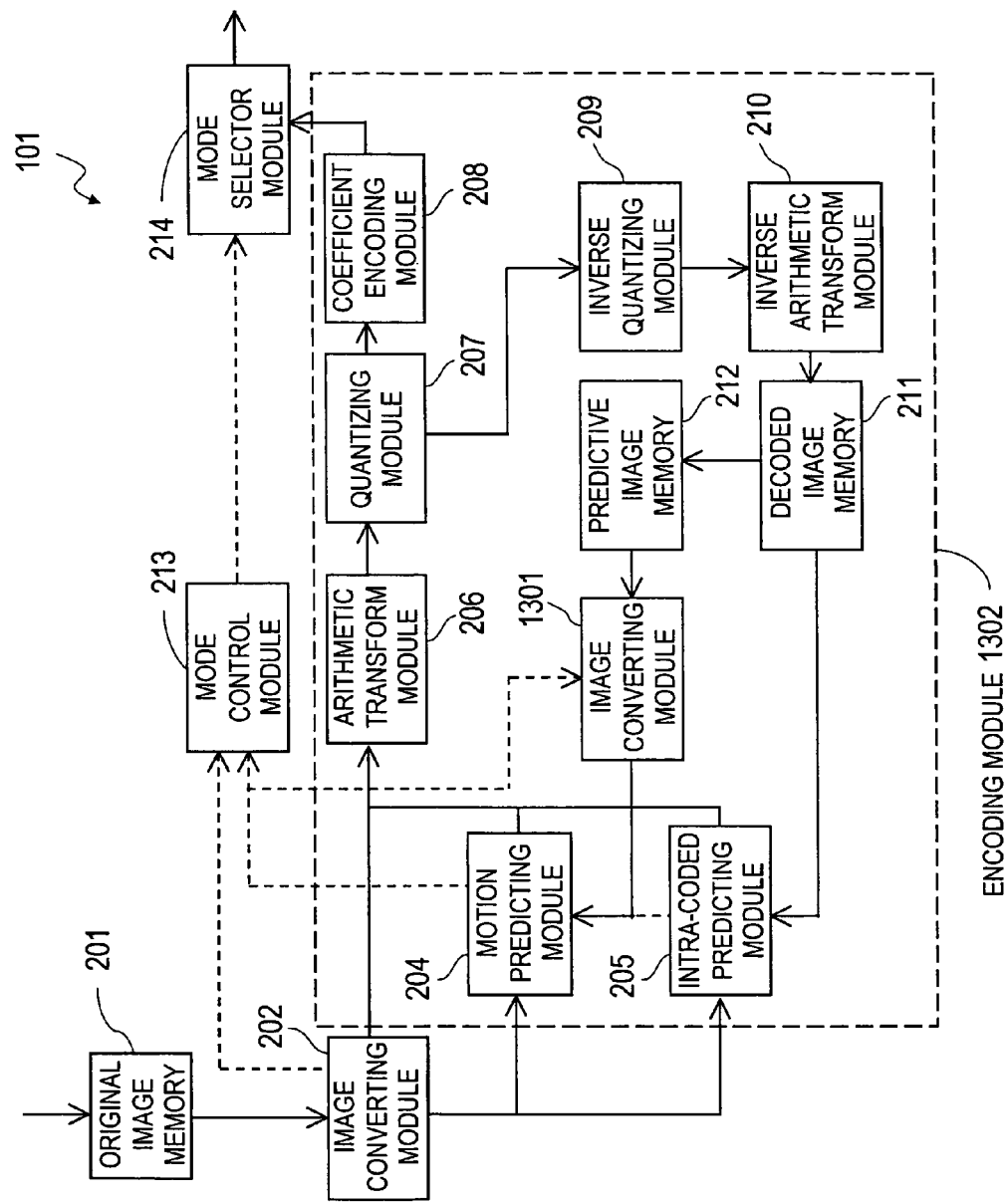
FIG. 13 is a block diagram of the functions of an image encoding device, which is a sixth preferred embodiment of the invention.

FIG. 13 is a block diagram of the functions of the image encoding device 101, which is a sixth preferred embodiment of the invention. This shows, regarding the image encoding device of the first embodiment of the invention illustrated in FIG. 2, a case in which conversion processing is also performed in inter-coded prediction.

The image encoding device 101 comprises an original image memory 201, an image converting module 202, an encoding module 1302, a mode control module 213 and a mode selector module 214. The original image memory 201, the image converting module 202, the mode control module 213 and the mode selector module 214 here are the same as their respective counterparts in the image encoding device of the first embodiment. A distinct feature of the image encoding device of the sixth embodiment is that it has in the encoding module 1302 an image conversion module 1301 for inversely converting a predictive image controlled by the mode control module 213.

The conversion processing performed by the image conversion module 1301, though similar to the processing done by the image converting module 202, has as its object a reference frame. Thus, the image conversion module 1301 executes, for instance, axial symmetry conversion or point symmetry conversion of the reference frame. The axial symmetry conversion means, for instance, right-left symmetry conversion by which the reference frame is inverted laterally or up-down symmetry conversion by which the reference frame is inverted vertically. Point symmetry conversion means, for instance, rotational conversion by which the reference frame is rotated. The image converting module 1301 may combine these modes of conversion.

To add, the image encoding device 101 of this embodiment is provided with two image converting modules 202 and 1301 as shown in FIG. 13. However, they may be physically a single image conversion module. Thus, the image encoding device 101 may be provided with a single image conversion module, which is enabled to serve as either the image converting module 202 or the image conversion module 1301 by switching its input/output.

Figure 14:
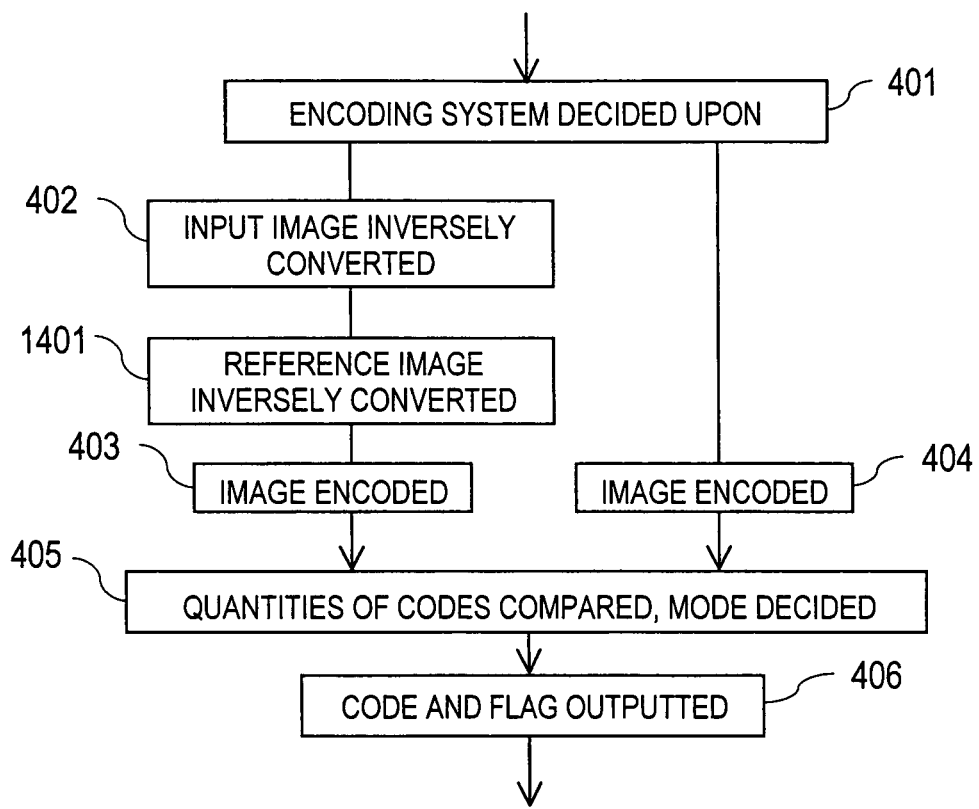
FIG. 14 illustrates the procedure of image encoding by the sixth preferred embodiment of the invention.

FIG. 14 illustrates the procedure of image encoding by the sixth preferred embodiment of the invention. This shows, regarding the image encoding procedure of the first embodiment of the invention illustrated in FIG. 4, a case in which conversion processing is also performed in inter-coded prediction.

This procedure differs from image encoding by the first embodiment in that, before encoding the image having undergone right-left symmetry conversion at step 403, the image conversion module 1301 performs conversion of the reference image already at step 1401 in accordance with information transmitted to the mode control module 213 as to whether or not conversion processing has been performed. The method of image conversion is the same as the method of conversion at step 402, and the particulars of processing are the same as those shown in FIG. 13.

In this way, the image converting modules 202 and 1301 perform conversion processing to code in the same direction the frame to be encoded and stored into the original image memory 201 and the reference frame to be stored into the predictive image memory 212. Processing including motion prediction in the inter-coded prediction can be the same as in the conventional system. In this embodiment as well, a case in which the whole image is subjected to right-left symmetry conversion and a case in which it is not are compared and what involves a smaller quantity of codes for picture quality of about the same level is selected, data of higher encoding efficiency can be used.

Figure 15:
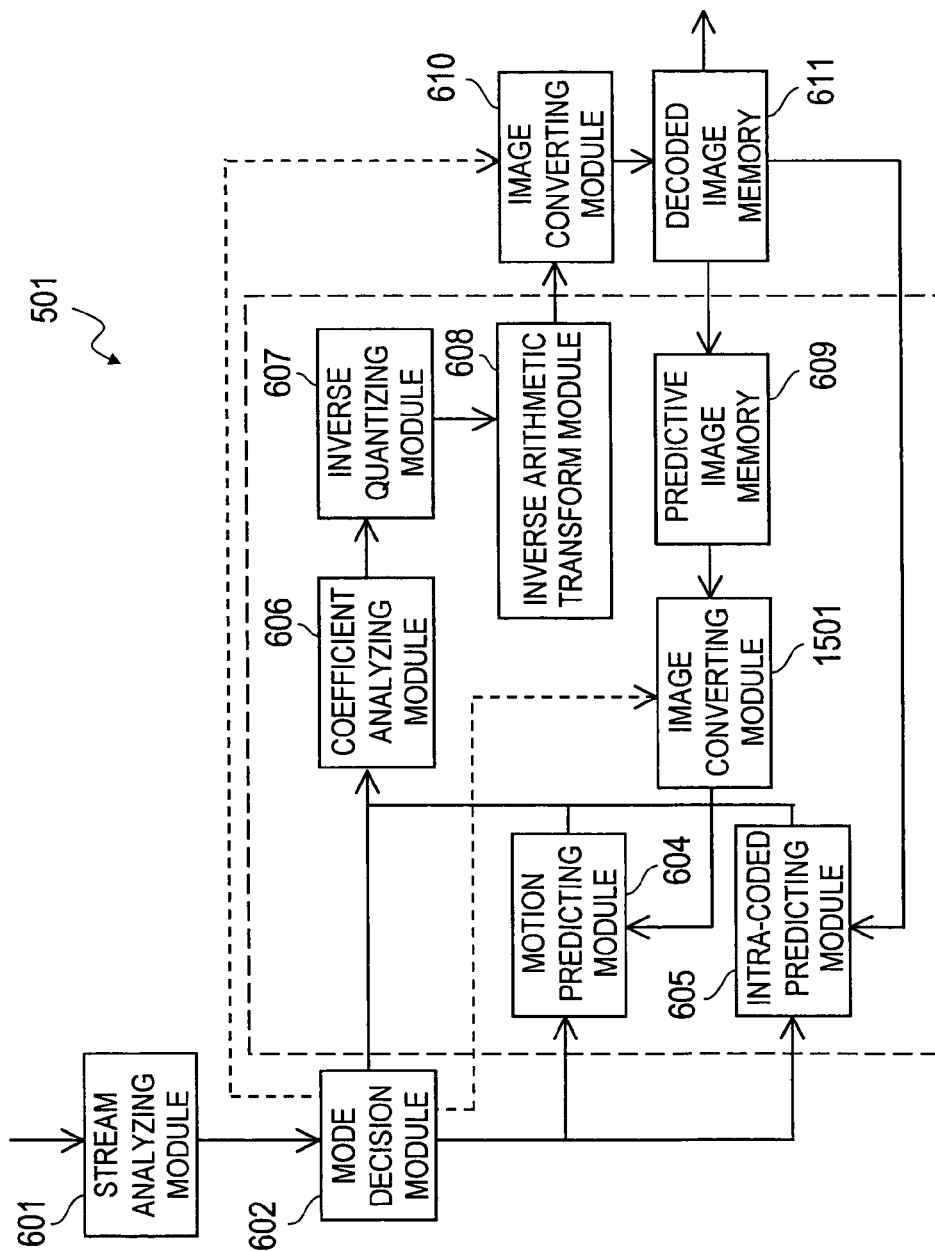
FIG. 15 is a block diagram of the functions of an image decoding device, which is a seventh preferred embodiment of the invention.

FIG. 15 is a block diagram of the functions of an image decoding device 501, which is a seventh preferred embodiment of the invention. This shows, regarding the image decoding device of the second embodiment of the invention illustrated in FIG. 6, a case in which conversion processing is also performed in inter-coded prediction.

The image decoding device 501 comprises a stream analyzing module 601, a mode decision module 602, a decoding module 1502, an image converting module 610 and an decoded image memory 611. The stream analyzing module 601, the mode decision module 602, the image converting module 610 and the decoded image memory 611 are the same as their respective counterparts in the image decoding device of the second embodiment. A distinct feature of the image decoding device of the seventh embodiment is that the decoding module 1502 has within it an image conversion module 1501 for inversely converting a predictive image (reference frame) controlled by the mode decision module 602. Conversion processing performed by the image conversion module 1501 is the same as that by the image converting module 610 described above.

In the decoding of inter-coded prediction according to the invention, when the mode decision module 602 detects an inversion flag, the image converting module 610 and the image conversion module 1501 within the decoding module are instructed to perform conversion processing and, after the reference frame is processed for inversion, the current frame is subjected to inter-coded prediction and decoding, followed by the inversion of the finished image and its outputting.

To add, the image decoding device 501 of this embodiment is provided with two image converting modules 610 and 1501 as shown in FIG. 15. However, they may be physically a single image conversion module. Thus, the image decoding device 501 may be provided with a single image conversion module, which is enabled to serve as either the image converting module 610 or the image conversion module 1501 by switching its input/output.

Figure 16:
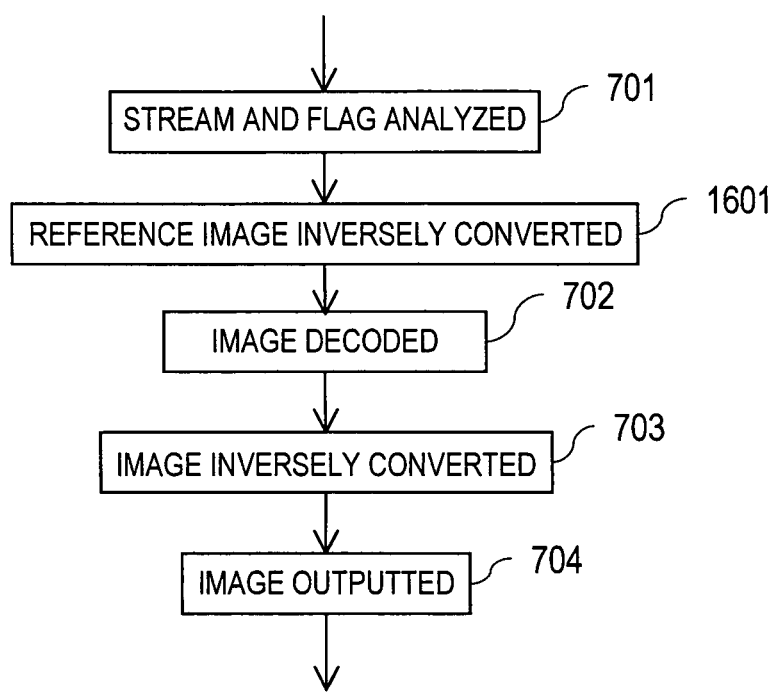
FIG. 16 illustrates the procedure of image decoding by the seventh preferred embodiment of the invention.

FIG. 16 illustrates the procedure of image decoding by the seventh preferred embodiment of the invention. This shows, regarding the image decoding procedure of the second embodiment of the invention illustrated in FIG. 7, a case in which conversion processing is also performed in inter-coded prediction.

This procedure differs from image decoding by the second embodiment in that, before decoding the image at step 702, the reference frame is converted at step 1601. The method of image conversion is the same as the method of conversion at step 703, and the particulars of processing are the same as those shown in FIG. 15.

Thus, the sixth and seventh embodiments of the invention can respectively provide an image encoding device capable of reducing the quantities of codes after encoding (i.e. achieving a higher rate of compression) by performing inter-coded prediction always in the direction of higher accuracy of prediction without having to alter the scanning direction, and an image decoding device matching this encoding device. As a result, the quantity of codes can be reduced by about 10% compared with conventional intra-coded prediction.

To add, this invention is applicable to image encoding devices, image decoding devices and the like conforming to not only H.264/AVC but also various other standards.

This invention can be utilized in the recording and transmission of image data, and contributes to reducing the recording capacity requirement and enhancing the transmission speed by improving the rate of compression and curtailing the quantity of data. For instance, the invention can be used in video recorders and video players using a hard disk or a DVD. The invention can also be utilized in image distribution services using a wired or wireless communication network, including cellular telephones and television broadcasting. Furthermore, the invention can be used in TV telephone and TV conference systems.

What is claimed is:

1. A method of inter-coded predictive decoding images comprising the steps of:
    receiving an encoded image information to be decoded and a flip information indicating whether a partial area of an image to be decoded is flipped or not, wherein in the encoded image information both a flipped partial area and a non-flipped partial area are included in one image;
    deciding whether to flip a partial area of a reference image which is previously decoded and stored, according to the flip information,
    flipping the partial area of the reference image,
    decoding the encoded image information into a decoded image using the flipped reference image, and
    storing the decoded image as a reference image.

* * * * *